(12) United States Patent
Birch et al.

(10) Patent No.: US 7,870,722 B2
(45) Date of Patent: Jan. 18, 2011

(54) SYSTEMS AND METHODS FOR PASSIVELY DIRECTING AIRCRAFT ENGINE NOZZLE FLOWS

(75) Inventors: Stanley F. Birch, Renton, WA (US); Alexander N. Secundov, Moscow (RU); Dmitriy A. Lyubimov, Moscow region (RU); Konstantin M. Khritov, Moscow (RU); Vladimir P. Maslov, Moscow region (RU); Aleksey K. Mironov, Moscow (RU)

(73) Assignee: The Boeing Company, Chicago, IL (US)

( * ) Notice: Subject to any disclaimer, the term of this patent is extended or adjusted under 35 U.S.C. 154(b) by 1008 days.

(21) Appl. No.: 11/635,737

(22) Filed: Dec. 6, 2006

(65) Prior Publication Data

US 2008/0134665 A1 Jun. 12, 2008

(51) Int. Cl.
*F02K 3/02* (2006.01)
(52) U.S. Cl. ............... 60/226.1; 60/770; 239/265.17
(58) Field of Classification Search ......... 60/226.1, 60/262, 770, 231; 239/265.17; 181/213, 181/220
See application file for complete search history.

(56) References Cited

U.S. PATENT DOCUMENTS

| | | | |
|---|---|---|---|
| 3,648,800 A | | 3/1972 | Hoerst |
| 3,721,314 A | * | 3/1973 | Hoch et al. ............. 181/215 |
| 4,043,522 A | | 8/1977 | Vetter |
| 4,215,536 A | | 8/1980 | Rudolph |
| 4,372,110 A | | 2/1983 | Fletcher et al. |

(Continued)

FOREIGN PATENT DOCUMENTS

EP 0913567 A2 5/1999

(Continued)

OTHER PUBLICATIONS

Thomas, Russel H. et al., "Computational Analysis of Pylon-Chevron Core Nozzle Interaction," pp. 1-12, AIAA/CEAS Aeroacoustics Conference, May 2001, Maastricht, The Netherlands.

(Continued)

*Primary Examiner*—Michael Cuff
*Assistant Examiner*—Craig Kim
(74) *Attorney, Agent, or Firm*—Perkins Coie LLP

(57) ABSTRACT

Systems and methods for passively directing aircraft engine nozzle flow are disclosed. One system includes an aircraft nozzle attachable to an aircraft turbofan engine, with the nozzle including a first flow path wall bounding a first flow path and being positioned to receive engine exhaust products, and a second flow path wall bounding a second flow path and being positioned to receive engine bypass air. The first flow path wall is positioned between the first and second flow paths, and the second flow path wall is positioned between the second flow path and an ambient air flow path. Multiple flow passages can be positioned in at least one of the first and second flow path walls to passively direct gas from a corresponding flow path within the flow path wall through the flow path wall to a corresponding flow path external to the flow path wall. Neighboring flow passages can have neighboring circumferentially-extending and circumferentially-spaced exit openings positioned at an interface with the corresponding flow path external to the flow path wall.

17 Claims, 4 Drawing Sheets

U.S. PATENT DOCUMENTS

| | | | |
|---|---|---|---|
| 4,487,017 | A | 12/1984 | Rodgers |
| 4,501,393 | A * | 2/1985 | Klees et al. ............ 239/265.13 |
| 4,819,425 | A | 4/1989 | Farquhar et al. |
| 5,884,472 | A | 3/1999 | Presz, Jr. et al. |
| 5,924,632 | A | 7/1999 | Seiner et al. |
| 5,947,412 | A | 9/1999 | Berman |
| 6,082,635 | A | 7/2000 | Seiner et al. |
| 6,314,721 | B1 | 11/2001 | Mathews et al. |
| 6,532,729 | B2 | 3/2003 | Martens |
| 6,612,106 | B2 | 9/2003 | Balzer |
| 6,640,537 | B2 | 11/2003 | Tse |
| 6,658,839 | B2 | 12/2003 | Hebert |
| 6,718,752 | B2 | 4/2004 | Nesbitt et al. |
| 6,751,944 | B2 | 6/2004 | Lair |
| 6,786,037 | B2 | 9/2004 | Balzer |
| 6,837,456 | B1 | 1/2005 | Shih et al. |
| 6,971,229 | B2 | 12/2005 | Lair |
| 7,010,905 | B2 | 3/2006 | Lair |
| 7,055,329 | B2 | 6/2006 | Martens et al. |
| 7,246,481 | B2 | 7/2007 | Gutmark et al. |
| 7,293,401 | B2 * | 11/2007 | Papamoschou ............ 60/226.1 |
| 7,310,939 | B2 | 12/2007 | Prouteau et al. |
| 7,469,529 | B2 | 12/2008 | Feuillard et al. |
| 7,637,095 | B2 * | 12/2009 | Winter et al. ............ 60/226.1 |
| 2002/0178711 | A1 | 12/2002 | Martens |
| 2003/0182925 | A1 | 10/2003 | Lair |
| 2003/0201366 | A1 | 10/2003 | Connelly et al. |
| 2004/0006969 | A1 | 1/2004 | Whurr |
| 2004/0074224 | A1 | 4/2004 | Hebert |
| 2004/0088967 | A1 | 5/2004 | Webster et al. |
| 2004/0237501 | A1 | 12/2004 | Brice et al. |
| 2005/0188676 | A1 * | 9/2005 | Lair ........................ 60/226.3 |
| 2005/0214107 | A1 | 9/2005 | Gutmark et al. |
| 2008/0078159 | A1 | 4/2008 | Thomas et al. |
| 2008/0272228 | A1 | 11/2008 | Mengle et al. |

FOREIGN PATENT DOCUMENTS

| | | |
|---|---|---|
| EP | 0984152 A2 | 3/2000 |
| EP | 1367249 A1 | 12/2003 |
| EP | 1482160 A1 | 12/2004 |
| EP | 1580418 A2 | 9/2005 |
| EP | 1703114 A1 | 9/2006 |
| EP | 1905998 A2 | 4/2008 |
| FR | 2091911 A1 | 1/1971 |
| GB | 1127659 A | 9/1968 |
| GB | 2146702 A | 4/1985 |
| GB | 2149456 A | 6/1985 |
| GB | 2207468 A | 2/1989 |
| WO | WO-0053915 A1 | 9/2000 |
| WO | WO-0229232 A1 | 4/2002 |
| WO | WO-2005021934 A2 | 3/2005 |

OTHER PUBLICATIONS

U.S. Appl. No. 11/707,217, filed Feb. 14, 2007, Alkislar.

U.S. Appl. No. 11/502,130, filed Aug. 9, 2006, Mengle.

Aeroacoustics, Aerospace Sciences, Aerospace America, Dec. 2005, 1 page.

Alkislar, Mehmet et al., "Significant Innprovementsin Jet Noise Reduction using Chevron—MicrojetCombination," American Institute of Aeronautics and Astronautics, 2007, 5 pages.

Arakeri, V.H. et al., "On the use of microjets to suppress turbulence in a March 0.9 axisymmetric jet," J. Fluid Mech, Cambridge University Press 2003, vol. 490, pp. 75-98.

Bridges, James et al., "Parametric testing of Chevrons on single flow hot jets," AIAA 2004-2824, 10th AIAA/CEAS Aeroacoustics Conference, May 10, 2004, 17 pages.

Dash, S.M. et al., "CFD Support for Jet Noise Reduction Concept Design and Evaluation for F/A 18 E/F Aircraft," Combustion Research and Flow Technology, Inc., 2005, 6 pages.

Greska et al., "The Effects of Microjet Injection on an F404 Jet Engine," AIAA 2005-3047, 11th AIAA/CEAS Aeroacoustics Conference, May 23-25, 2005, Monterey, California, 23 pages.

Janardan, B.A. et al., AST Critical Propulsion and Noise Reduction Technologies for Future Commercial Subsonic Engines, NASA CR 2000-210039, Dec. 2000, 300 pages.

Krothapalli, A., "Aeroacoustics of Twin Supersonic Impinging Jets," AIAA Conference May 12, 2003, 11 pages.

Massey, Steven J., "Computation Analysis of a Chevron Nozzle Uniquely Tailored for Propulsion Airframe Aeroacoustics," AIAA 2006-2436, 12th AIAA/CEAS Conference, May 8-10, 2006, Cambridge MA, 23 pages.

Massey, Steven J., "Computation Analyses Propulsion Aeroacoustics for Mixed Flow Nozzle Pylon Installation Takeoff," NASA/CR 2001-211056, Sep. 2001.

Mengle, Vinod G. et al., "Flight Test Results for Uniquely Tailored Propulsion-Airframe Aeroacoustic Chevrons; Shockcell Noise," AIAA 2006-2439, 12th AIAA-CEAS Conference, Cambridge MA, May 8-10, 2006, 17 pages.

Mengle, Vinod G. et al., "Reducing Propulsion Airframe Aeroacoustic Interactions with Uniquely Tailored Chevrons: 3 Jet-Flap Interaction," AIAA 2006-2435, 12th AIAA-CEAS Conference, Cambridge MA, May 8-10, 2006, 15 pages.

Mengle, Vinod G. et al., "Internal Flow and Noise of Chevrons and Lobe Mixers in Mixed-Flow Nozzles," AIAA 2006-623, 44th AIAA Meeting, Reno, NV, Jan. 9-12, 2006, 17 pages.

Mengle, Vinod G. et al., "Jet Noise Characeristics of Chevrons in Internally Mixed Nozzles," AIAA 2005-2934, 11th AIAA-CEAS Conference, Monterey, CA, May 23-25, 2005, 15 pages.

Mengle, Vinod G. et al., "Reducing Propulsion Airframe Aeroacoustic Interactions with Uniquely Tailored Chevrons: 1 Isolated Nozzles," AIAA 2006-2467, 12th AIAA-CEAS Conference, Cambridge MA, May 8-10, 2006, 18 pages.

Mengle, Vinod G. et al., "Relative Clocking of Enhanced of Mixing Devices of Jet Noice Benefit," AIAA 2005-996, AIAA Meeting, Reno, NV, Jan. 10-13, 2005, 14 pages.

Nesbitt, Eric et al., "Flight Test Results for Uniquely Tailored Propulsion-Airframe Aeroacoustic Chevrons; Community Noise," AIAA 2006-2438, 12th AIAA/CEAS Conference, Cambridge, MA, May 8-10, 2006, 13 pages.

Results of NASA Aircraft Noise Research; http://www.aero-space.nasa.gov/vsp/QTD2.htm; accessed on Jul. 12, 2006, 2 pages.

Saiyes, Naseem H. et al., "Acoustics and Thrust of Quiet Separate-Flow High-Bypass-Ratio Nozzles," AIAA Journal, vol. 41, No. 3, Mar. 2003, pp. 372-378.

Thomas et al., "Jet-Pylon Interaction of High Bypass Rario Separate Flow Nozzle Configurations," 10th AIAA/CEAS Aeroacoustics Conference, Manchester, U.K., May 2004, pp. 1-16.

Wallace, James, "Boeing makes 'quiet' advances," Seattle PI, Aug. 11, 2005, 4 pages.

Alkislar, Mehmet et al., "The Effect of Streamwise Vortices on the Aeroacoustics of a Mach 0.9 Jet," Nov. 7, 2006, Department of Mechanical Engineering, Tallahassee, FL, 47 pages.

Bultemeier et al., "Effect of Uniform Chevrons on Cruise Shockcell Noise," AIAA- 2006-2440 27th Aeroacoustics Conference, Cambridge, Massachusetts, May 8-10, 2006, 15 pages.

Mengle, Vinod G. et al., "Reducing Propulsion Airframe Aeroacoustic Interactions with Uniquely Tailored Chevrons: 2 Installed Nozzles," 12th AIAA-CEAS Conference, Cambridge MA, May 8-10, 2006, 14 pages.

Woodward et al., "Aeroacoustic Analysis of Fan Noise Reduction with Increased Bypass Nozzle Area," AIAA- 2005-3075 26th Aeroacoustics Conference, Monteray, California, May 23-25, 2005, 33 pages.

European Search Report, European Application No. 07122560.1, Appilcant: The Boeing Company, mailed Mar. 24, 2010, 6 pages.

\* cited by examiner

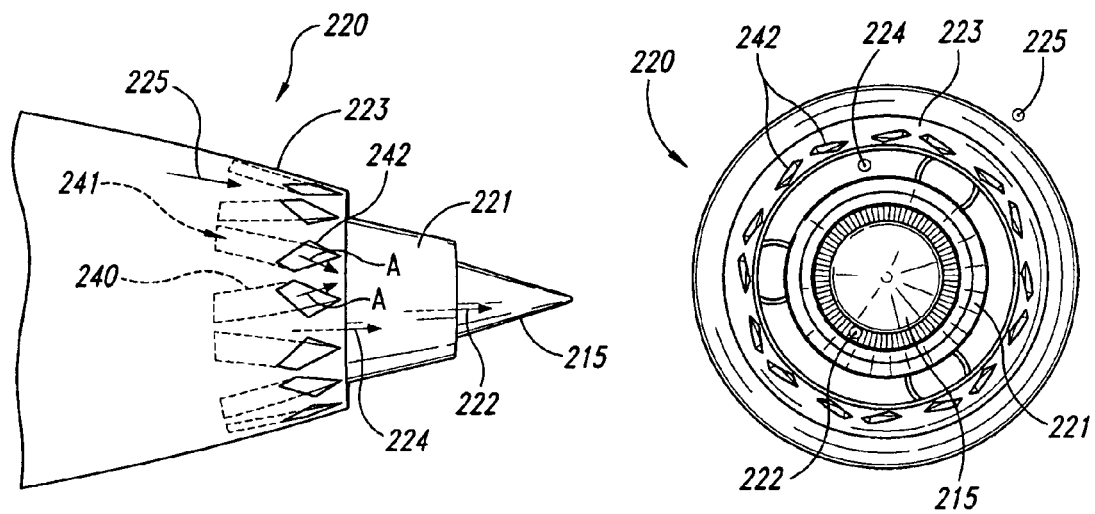
*Fig. 4A*         *Fig. 4B*
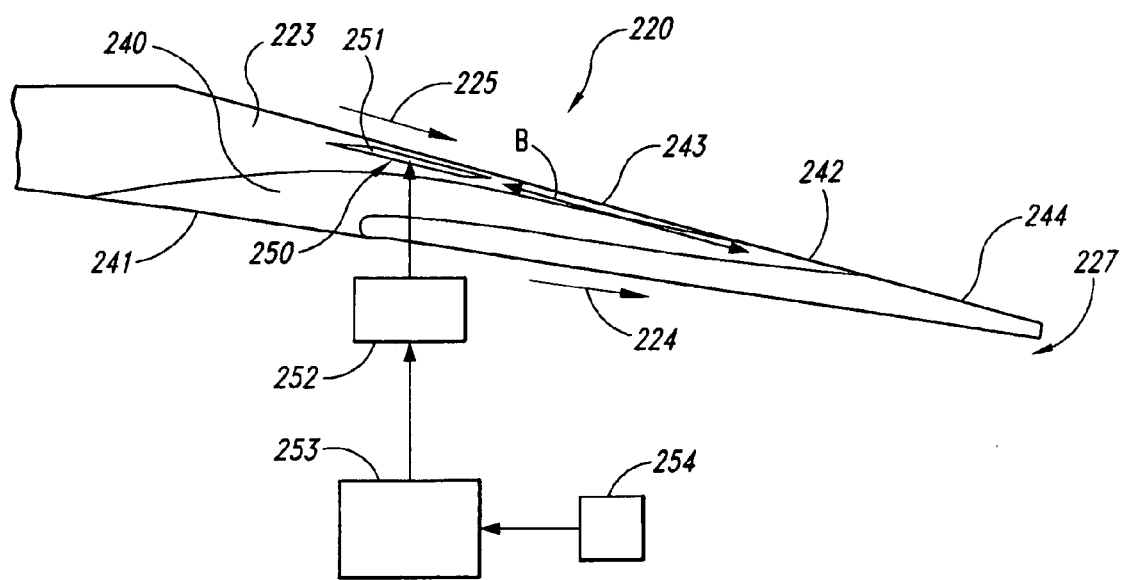
*Fig. 5*

SYSTEMS AND METHODS FOR PASSIVELY DIRECTING AIRCRAFT ENGINE NOZZLE FLOWS

TECHNICAL FIELD

The present disclosure is directed to systems and methods for passively directing engine nozzle flows. In particular embodiments, the flow can aerodynamically emulate the effect of nozzle chevrons, and/or can alter the effective nozzle exit area.

BACKGROUND

Aircraft manufacturers are under continual pressure to reduce the noise produced by aircraft in order to satisfy increasingly stringent noise certification rules. Aircraft engines are a major contributor to overall aircraft noise. Accordingly, aircraft engines in particular have been the target of manufacturers' noise reduction efforts. Aircraft engines have been made significantly quieter as a result of advanced high bypass ratio engines. These engines derive a significant fraction of their total thrust not directly from jet exhaust, but from bypass air which is propelled around the core of the engine by an engine-driven forwardly mounted fan. While this approach has significantly reduced aircraft noise when compared with pure turbojet engines and low bypass ratio engines, engine and aircraft federal regulations nevertheless continue to require further engine noise reductions.

One approach to reducing engine noise is to increase the amount of mixing between the high velocity gases exiting the engine, and the surrounding freestream air. FIG. 1 illustrates a nozzle 20 having "chevrons" that are designed to produce this effect. Chevrons generally include certain types of serrations on the nozzle lip, typically, triangular in shape and having some curvature in the lengthwise cross-section, which slightly immerses them in the adjacent flow. The chevron can project either inwardly or outwardly, by an amount that is on the order of the upstream boundary layer thickness on the inner or outer surface, respectively. In general, the chevron planform shape can alternatively be trapezoidal or rectangular. The nozzle 20 includes a core flow duct 22 through which the engine core flow is directed, and a fan flow duct 24 arranged annularly around the core flow duct 22, through which the fan air passes. The exit aperture of the fan flow duct 24 can include fan flow chevrons 19, and the exit aperture of the core flow duct 22 can include core flow chevrons 18. The chevrons typically reduce low-frequency noise by increasing the rate at which the engine flow streams mix with the surrounding freestream air at the length scale of the nozzle diameter. While this approach has resulted in noise reduction compared with nozzles that do not include chevrons, further noise reduction is desired to meet community noise standards.

SUMMARY

The following summary is provided for the benefit of the reader only and is not intended to limit in any way the invention as set forth by the claims. Particular aspects of the disclosure are directed to systems and methods for passively directing engine nozzle flow. A system in accordance with one embodiment includes an aircraft nozzle attachable to an aircraft turbofan engine, with the nozzle including a first flow path wall bounding a first flow path and a second flow path wall bounding a second flow path. The first flow path is positioned to receive engine exhaust products, and the second flow path is positioned to receive engine bypass air. The first flow path wall is positioned between the first and second flow paths, and the second flow path wall is positioned between the second flow path and an ambient air flow path. Multiple flow passages are positioned in at least one of the first and second flow path walls. The flow passages are positioned to passively direct gas from a corresponding flow path within the flow path wall through the flow path wall to a corresponding flow path external to the flow path wall. Neighboring flow passages have circumferentially-extending and circumferentially-spaced apart exit openings positioned at an interface with the corresponding flow path external to the flow path wall.

In further particular aspects, individual exit openings can have a corresponding closure device, and the system further includes an actuator operatively coupled to the closure device to open and close the exit openings. In still further particular embodiments, the corresponding flow path within the flow path wall terminates at a trailing edge that does not include aft-extending projections (e.g., chevrons). In still a further aspect, the individual flow passages do not include a device that adds energy to the flow passing through the passage.

Other aspects of the disclosure are directed to methods for operating an aircraft engine. One such method includes directing exhaust gas products from an aircraft turbofan engine along the first flow path of a corresponding engine nozzle, and directing bypass air around the engine and along a second flow path of the engine nozzle. The method can still further include passively directing gas, (a) from the first flow path to the second flow path at intermittent circumferential locations, (b) from the second flow path to an ambient air stream, at intermittent circumferential locations, or (c) both (a) and (b).

In further aspects, the method can include passively directing the gas through circumferentially spaced apart exit openings located at an interface with the ambient air stream. The method can still further include selectively closing the exit openings at the interface to reduce the effective exit area for the bypass air, and selectively re-opening the exit openings in a manner that corresponds with the thrust produced by the engine and the ambient conditions.

BRIEF DESCRIPTION OF THE DRAWINGS

FIG. 4A is a side elevation view of an engine nozzle having flow passages positioned between a bypass flow stream and ambient flow stream in accordance with an embodiment of the invention.

FIG. 4B is an end view of the nozzle shown in FIG. 4A.

FIG. 5 is a schematic, cross-sectional illustration of a flow passage having characteristics configured in accordance with embodiments of the invention.

DETAILED DESCRIPTION

Aspects of the present disclosure are directed to aircraft nozzles having flows passively directed from one flow path to another, and associated systems and methods. Particular arrangements can be used to emulate the effects of nozzle "chevrons," and/or to vary the effective nozzle exit area. Specific details of certain embodiments are described below with reference to FIGS. 2-7. Several details of structures or processes that are well-known and often associated with such methods and systems are not set forth in the following description for purposes of brevity. Moreover, although the following disclosure sets forth several embodiments of different aspects of the invention, several other embodiments of the invention can have different configurations or different components than those described in this section. Accordingly, the invention may have other embodiments with additional elements and/or without several of the elements described below with reference to FIGS. 2-7.

In general, the passively directed flow can be used to accomplish any one or combination of the following results. First, the flow can be directed through multiple flow passages to form jets that are arranged to directly emulate "hardware" (e.g., metal or composite) chevrons. The jets can be used to reduce jet noise at take-off, or to reduce shock noise during cruise. In general, the design of the flow passages may differ depending on which noise reduction goal is to be emphasized. This is due, at least in part, to the differing external flow velocities at take-off and cruise. Accordingly, the designer can design the flow passages to specifically address one of the foregoing noise issues, or make the geometry of the passages adjustable so as to address (at least in part) both noise issues.

Second, the flow passages can be arranged so that the jets merge, to partially mix with the external flow and to reduce the velocity gradient at the nozzle exit. This is not expected to produce a vortex generator effect, but can still reduce both jet noise and shock noise. Again, the geometry of the flow passages can be made adjustable to address both issues.

Third, the flow passages can be used to vary the effective area of the nozzle. The variable area application is directed primarily at reducing fan noise, but would also lead to some jet noise reduction. Again, the geometry of the flow passages can be made adjustable. It is expected that at least some jet noise reduction will result even when the slots are adjusted for optimum fan performance at a particular flight condition. These and other features are described further below with reference to FIGS. 2-7.

Figure 2:
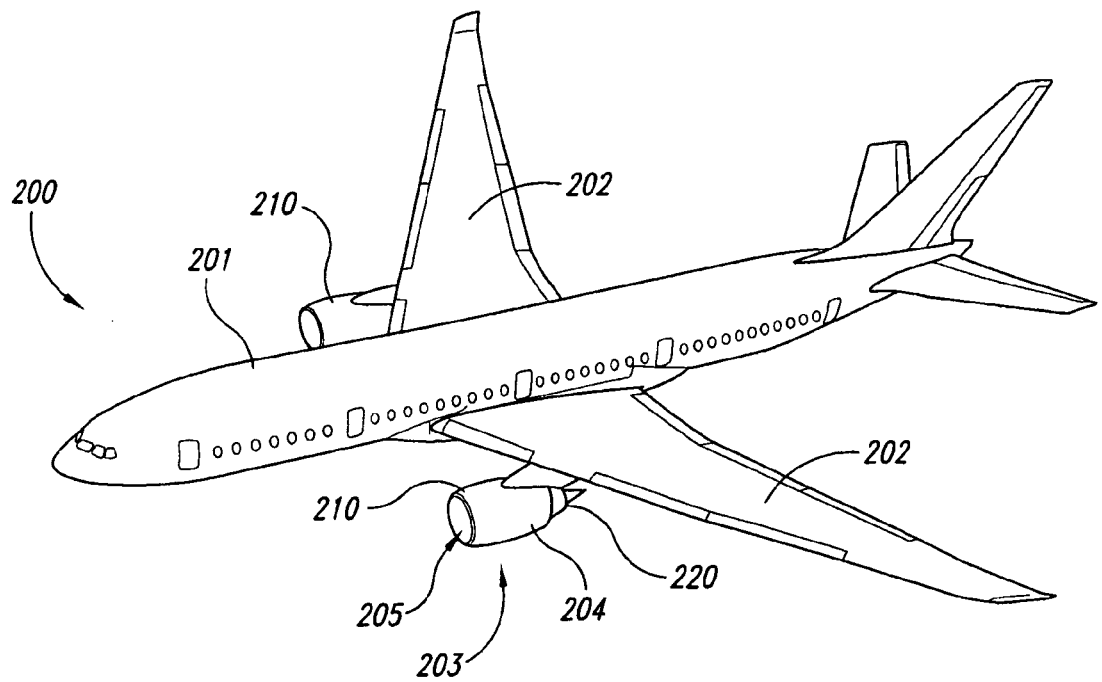
FIG. 2 illustrates an aircraft having nozzles configured in accordance with an embodiment to the invention.

FIG. 2 is an illustration of a commercial jet transport aircraft 200 having wings 202, a fuselage 201, and a propulsion system 203. The illustrated propulsion system 203 includes two turbofan engines 210 carried by the wings 202, though in other embodiments, the engines 210 may be carried by the fuselage 201 or other aircraft structures. Each engine 210 is housed in a nacelle 204, which includes an inlet 205 and a nozzle 220. The nozzles 220 include particular features, discussed in greater detail below, that reduce noise and/or alter the nozzle exit area in one or more selected manners.

Figure 3:
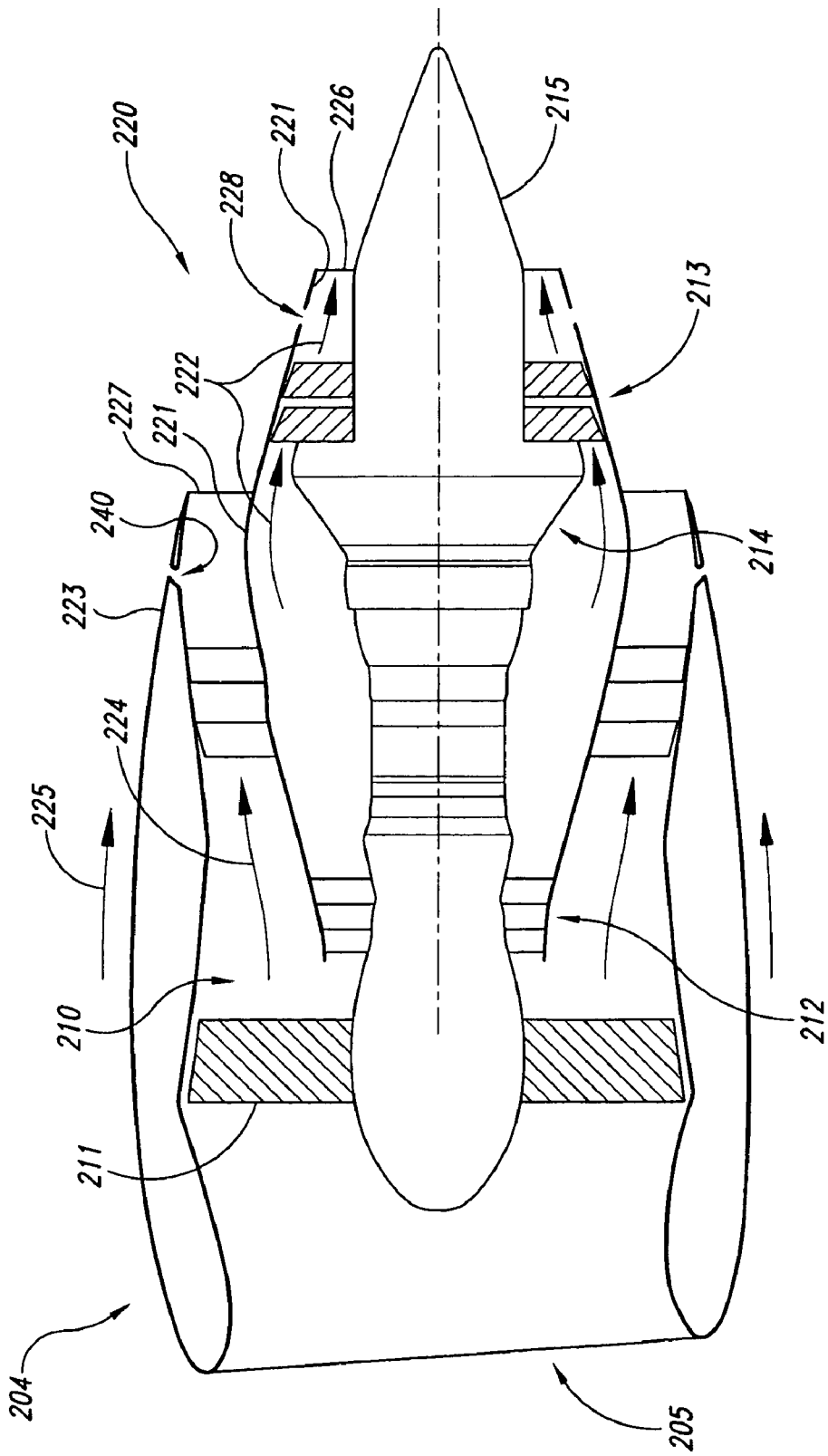
FIG. 3 is a simplified, schematic, cross-sectional illustration of an engine and nozzle having flow passages positioned in accordance with embodiments of the invention.

FIG. 3 is a simplified, schematic, cross-sectional illustration of one of the nacelles 204 and associated engine 210. For purposes of illustration, many of the internal features of the engine 210 are shown schematically and/or in a simplified format. The engine 210 includes a compressor 212 that receives ambient air through the inlet 205. The compressor 212 provides pressurized air to the combustor 214 where the air is mixed with fuel, ignited, and expanded through a turbine 213. The exhaust products pass from the turbine 213 along a first or core flow path 222 around a nozzle exit cone 215. The first flow path 222 is bounded externally by a first wall 221, and terminates at a first flow path exit 226 positioned aft of the turbine 213.

The turbine 213 includes separate sections, one of which drives the compressor 212 and another of which drives a fan 211 positioned forward of the compressor 212. The fan 211 drives bypass air around the core of the engine 210 along a second or fan flow path 224. The second flow path 224 is bounded internally by the first wall 221, and externally by a second wall 223. The second wall 223 terminates at a second flow path exit 227.

The first wall 221 and/or the second wall 223 can include flow passages that passively direct flow from a corresponding flow path within the wall to a corresponding flow path outside the wall. For example, the first wall 221 can include first flow passages 228 that passively direct flow from the first flow path 222 to the second flow path 224. The first flow passages 228 can accordingly be located upstream of the first flow path exit 226 and downstream of the second flow path exit 227. The second wall 223 can include second flow passages 240 that passively direct flow from the second flow path 224 to an ambient air flow path 225 that passes around the nacelle 204. The flow passages 228, 240 are shown schematically in FIG. 3, and typically have a more aerodynamic shape than is shown in FIG. 3, as is discussed further with reference to FIG. 5.

Figure 1:
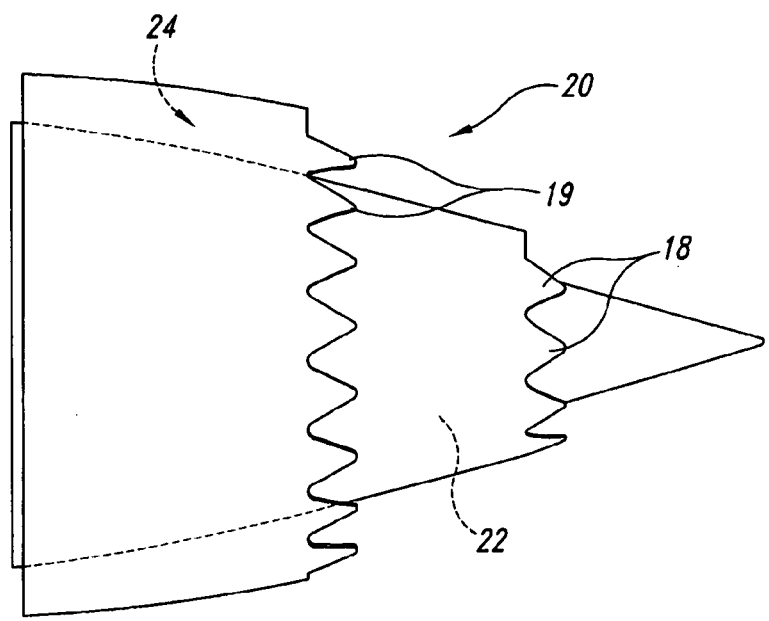
FIG. 1 schematically illustrates a nozzle configured in accordance with the prior art.

The flow passively directed through the flow passages 228, 240 can provide one or more of several functions. For example, the flow directed through these flow passages can take the form of circumferentially spaced apart jets that aerodynamically emulate the mixing effect produced by the mechanical chevrons described above with reference to FIG. 1. Accordingly, these jets can enhance mixing between the adjacent flows, and can thereby reduce engine noise. In other embodiments, the flow passages can effectively increase the exit area through which the engine-driven flow passes. In a particular embodiment, this effect is applied to the second or fan flow path 224 to increase the exit area available to the fan flow. In other words, the second flow passages can supplement the exit area available at the second flow path exit 227. In other embodiments, this approach may be used for the first or core flow path 222 in addition to or in lieu of the second flow path 224.

FIG. 4A is a side elevation view of the nozzle 220, illustrating a representative embodiment of the second flow passages 240 positioned in the second wall 223. Accordingly, the second flow passages 240 can passively direct flow from the second flow path 224 to the ambient flow path 225. Individual second flow passages 240 have an entrance opening 241 positioned at the inner surface of the second wall 223, and an exit opening 242 positioned at the outer surface of the second wall 223. Because the fan flow directed along the second flow path 224 typically has a higher pressure than the ambient air in the ambient air flow path 225, it is drawn (e.g., passively) through the second flow passages 240 into the ambient air flow path 225, as indicated by arrows A.

In the particular embodiment shown in FIG. 4A, neighboring pairs of exit openings 242 have mirrored trapezoidal shapes and are canted toward each other. This arrangement directs the corresponding flows passing through the neighboring second flow passages 240 toward each other to emulate a mechanical chevron. As discussed above, this effect is expected to increase mixing between the fan flow stream and the ambient air flow stream. In other embodiments, the shapes of the exit openings 242 and/or second flow passages 240 can be different (e.g., the exit openings 242 can be rectangular, triangular or ovoid).

FIG. 4B is an end view of the nozzle 220 shown in FIG. 4A. As shown in FIG. 4B, the exit openings 242 are positioned flush with the external surface of the second wall 223. Accordingly, the exit openings 242 do not include a rearward facing step. As discussed in greater detail below, this arrangement is expected to facilitate using the second flow passages 240 to control the exit area available to the fan flow passing along the second flow path 224.

FIG. 5 is a partially schematic, cross-sectional side view of a representative second flow passage 240 positioned in the second wall 223. The second flow passage 240 includes a smoothly contoured entrance opening 241 and, as discussed above, an exit opening 242 that is located flush with the external surface of the second wall 223. Accordingly, an upstream surface 243 positioned upstream of the exit opening 242 is positioned in the same generally smooth, contoured plane as a downstream surface 244 positioned downstream of the exit opening 242. The flow exiting the exit opening 242 can remain attached to the downstream surface 244 as a result of the Coanda effect.

When the second flow passages 240 are configured primarily to emulate the mixing effect of chevrons, they can (in at least one embodiment) remain open at all engine and aircraft operating settings. In other embodiments, the second flow passages 240 can be closed at particular engine settings and/or flight conditions. In such embodiments, the nozzle 220 can include a closure device 250 that is selectively operable to close the exit openings 242. In one aspect of this embodiment, the closure device 250 includes a door 251 that is positioned at the exit opening 242 and that slides aft to open the exit opening 242 and forward to close the exit opening 242, as indicated by arrow B. The door 251 accordingly forms a generally smooth, continuous contour with the upstream surface 243 and the downstream surface 244 when in the closed position. In other embodiments, the door 251 can move in other manners (e.g., by folding or rotating). An actuator 252 (shown schematically in FIG. 5) is operatively coupled to the door 251 to open and close the door 251. For example, each of the circumferentially extending and circumferentially spaced apart exit openings 242 can include a separate door 251, and a common actuator 252 can be used to drive all the doors 251 at once. In other embodiments, individual actuators 252 can control each door 251, or an arrangement of clutches can be used to selectively open and close particular individual doors 251 or subsets of doors 251. In one embodiment, the doors 251 can be moved only between a fully open and fully closed state, and in other embodiments, the doors 251 can be selectively placed at partially opened positions depending upon factors that include the desired level of control over the size and shape of the exit openings 242.

A controller 253 (also shown schematically) can be operatively coupled to the actuator(s) 252 to control the motion of the doors 251, and can receive inputs from one or more input devices 254. In one embodiment, the input device(s) 254 can be controlled manually by the pilot to selectively open and close the doors 251. In another embodiment, the input device(s) 254 can include one or more sensors that automatically detect a state of the aircraft engine and/or the aircraft flight condition (e.g., takeoff, climb-out, cruise, descent, or landing) and provide a corresponding input to the controller 253. In this embodiment, the controller 253 can automatically control the motion of the doors 251 without pilot intervention, though the pilot may override the controller 253 if desired.

As noted above, when the exit openings 242 are positioned to direct flow in a manner that emulates the effect of mechanical chevrons, the exit openings 242 can remain open during all aircraft operations. In other cases, for example, if it is determined that the noise reduction achieved by the mixing created by the exit openings 242 may be enhanced by closing some of the exit openings, the controller 253 can be used to do so. For example, in some cases, it may be desirable to close or partially close the doors 251 in the lower half of the nozzle 220, while doors 251 in the upper half remain open. In other embodiments, it may be desirable to close the doors 251 during flight regimes where noise reduction has a reduced significance, for example, if doing so improves the efficiency of the propulsion system.

Figure 6:
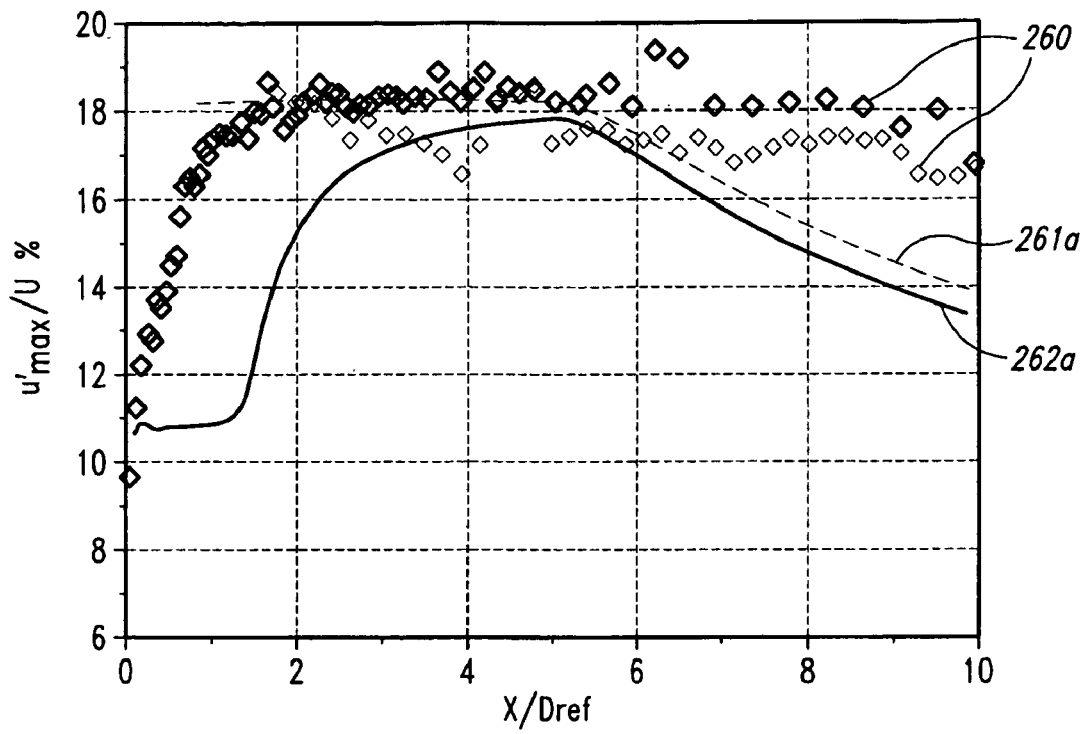
FIG. 6 is a graph illustrating predicted turbulence levels for nozzles having characteristics in accordance with embodiments of the invention.
Figure 7:
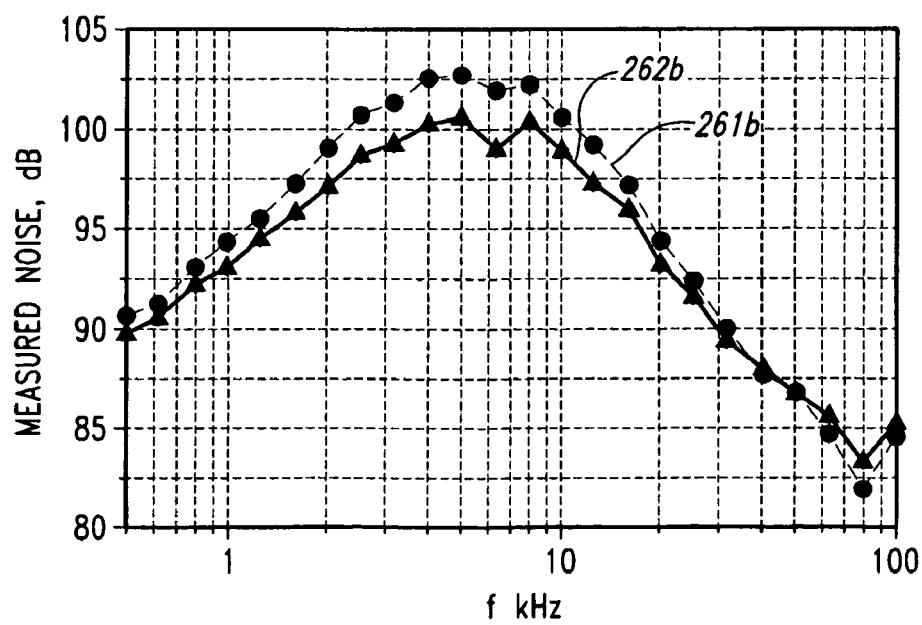
FIG. 7 is a graph illustrating predicted noise levels for nozzles having characteristics in accordance with embodiments of the invention.

In another mode of operation, the second flow passages 242 can be used to control the effective exit area for the fan flow directed along the second flow path 224. In one aspect of this embodiment, neighboring exit openings 242 are accordingly not canted toward each other, as shown in FIG. 2A, but instead are positioned to direct flow directly aftward. In still another aspect of this embodiment, the exit openings 242 may be positioned far enough upstream from the second flow path exit 227 so that the flows passing through neighboring flow passages 240 merge with each other before reaching the second flow path exit 227. Accordingly, it is expected that the merging flows will produce a jet of fan flow that is generally continuous in a circumferential direction. It is further expected that this generally circumferentially continuous jet of fan flow will represent an effective increase in fan flow exit area, provided by the combined exit areas of the exit openings 242. An expected advantage of this arrangement is that, with a higher effective exit area, the flow velocities at the second flow path exit 227 will be reduced, and accordingly, the noise produced by this flow will also be reduced. FIGS. 6 and 7, described later, illustrate the predicted effect.

In certain embodiments, the same arrangement of second flow passages 240 can be actively controlled to emphasize increased exit area or chevron emulation at different conditions. For example, to provide the maximum increase in exit area, all the second flow passages 240 can be opened. The emulate chevrons, alternating second flow passages 240 (alternating in a circumferential direction) can be closed.

FIG. 6 is a graph illustrating turbulence as a function of axial distance aft of an aircraft nozzle. Symbols 260 illustrate experimental data for two asymmetric nozzles. Line 261a illustrates predicted turbulence values for a similar nozzle, and indicates that the predictions roughly track the experimental data. Line 262a illustrates predicted turbulence values for a nozzle having circumferentially spaced apart flow passages 240 with a cross sectional shape generally similar to that shown in FIG. 5, positioned to provide a generally continuous stream of flow (e.g., with flows from neighboring flow passages 240 merging together) at the second flow path exit 227. FIG. 6 illustrates that the expected turbulence levels are generally lower than those without the flow passages 240 shown in FIG. 5, particularly close to the nozzle exit (e.g., at values of 0-3 nozzle diameters along the X axis)

FIG. 7 illustrates expected noise values as a function of frequency for a nozzle without passive flow passages (indicated by line 261b) and for a nozzle with passive flow passages (line 262b). The results are illustrated for take-off conditions. As shown in FIG. 7, it is expected that the presence of the flow passages 240 shown in FIG. 5 will reduce jet noise over a wide variety of frequencies.

One feature of at least some of the foregoing embodiments is that a nozzle having flow passages configured to emulate mechanical chevrons need not include the mechanical chevrons themselves. An advantage of this arrangement is that the flow passages are expected to be less subject to vibration and metal fatigue than the mechanical chevrons, and are therefore expected to be less susceptible to damage and to require less maintenance.

An additional feature of at least some embodiments is that the flow passages can be adjustable. For example, as discussed above, a closure device can be used to selectively open and close the flow passages. An expected advantage of this arrangement is that the flow passages can be controlled in a manner that meets both noise and performance objectives, which may change from one flight condition to another. The closure device can include a door that closes the flow passages at the exit openings of the flow passages. An advantage of this arrangement is that when the flow passages are closed, there is no residual backward facing step. Instead, the outer surface of the wall through which the flow passage extends in generally smooth and continuous manner when the flow passage is closed.

Another feature of at least some of the embodiments described above is that the flow passages do not include a device that adds energy to the flow passing through the passages. For example, the flow passages do not include plenums or other arrangements that are pressurized by compressed air bled from the engine. Instead, the flow passages rely on the pressure difference between gas within a selected nozzle wall (e.g., the first wall 221 or the second wall 223) and gas external to the wall. An advantage of this arrangement is that it is less cumbersome to implement than one that includes devices for actively pressurizing the air provided to the flow passages, and does not require air to be bled from the compressors or other engine sections, which can reduce engine performance.

Still another feature of at least some of the embodiments described above is that the flow passages, in particular, the second flow passages 240, can be positioned in close enough proximity to each other and far enough upstream from the second flow path exit 227 so as to mix and provide a generally continuous jet along the external surface of the second wall 223. Unlike at least some existing arrangements, the flow passages 240 receive flow only from the second flow path 224 and not from any upstream vents that receive air from the ambient air flow path 225. Accordingly, this arrangement effectively increases the exit area of the second flow path 224. As described above, it is expected that this arrangement can reduce engine noise by reducing exit velocities. An additional expected effect of the increased nozzle exit area is a reduced back pressure on the fan. The reduced back pressure is expected to improve the flow over the fan blades and reduce the noise generated by the fan itself.

A further advantage of the foregoing arrangement is that it can increase engine performance. For example, at high thrust conditions (e.g., at takeoff), it may be desirable to increase the exit area for the second flow path 224. At other flight conditions (e.g., at cruise), a reduced exit area may improve performance. Accordingly, in at least some embodiments, the closure device described above can adjust the area of the flow passages (e.g., open and close the flow passages) in a manner that depends on the engine thrust setting and/or the flight condition.

From the foregoing, it will be appreciated that specific embodiments of the invention have been described herein for purposes of illustration, but that various modifications may be made without deviating from the invention. For example, the flow passages described above with respect to the second flow path may also be applied to the first flow path. The flow passages may have internal geometries and exit openings with different shapes and/or different arrangements than are shown in the Figures. Certain aspects of the invention described in the context of particular embodiments may be combined or eliminated in other embodiments. For example, the flow passages may be concentrated at certain circumferential locations and positioned more sparsely at other circumferential locations if it is determined that such a spacing arrangement provides enhanced noise reduction and/or performance benefits. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft system, comprising:
   an aircraft nozzle attachable to an aircraft turbofan engine, the nozzle including:
   a first flow path wall bounding a first flow path and being positioned to receive engine exhaust products;
   a second flow path wall bounding a second flow path and being positioned to receive engine bypass air, the first flow path wall being positioned between the first and second flow paths, the second flow path wall being positioned between the second flow path and an ambient air flow path; and
   multiple flow passages positioned in at least one of the first and second flow path walls, the flow passages being positioned to passively direct gas from a corresponding flow path within the flow path wall through the flow path wall to a corresponding flow path external to the flow path wall, neighboring flow passages having neighboring circumferentially extending and circumferentially spaced apart exit openings positioned at an interface with the corresponding flow path external to the flow path wall, wherein for individual flow passages, the flow passage is angled circumferentially by a greater amount toward a first neighboring flow passage with which it is paired in a first circumferential direction than toward a second neighboring flow passage in a second circumferential direction opposite the first circumferential direction.

2. The system of claim 1 wherein the flow passages are contoured to direct the gas aftward.

3. The system of claim 1 wherein the corresponding flow path within the flow path wall terminates at a trailing edge that does not include spaced apart, aft-extending projections.

4. The system of claim 1 wherein the individual exit openings have a corresponding closure device at the exit openings, and wherein the system further comprises an actuator operatively coupled to the closure device to open and close the exit openings.

5. The system of claim 4, further comprising:
   an input device configured to transmit an input signal corresponding to at least one of an engine state and a flight condition; and
   a controller operatively coupled to the actuator and the input device to receive the input signal and direct operation of the actuator based at least in part on the input signal.

6. The system of claim 1 wherein the exit openings are positioned in the first flow path wall.

7. The system of claim 6 wherein the exit openings are positioned aft of a trailing edge of the second flow path wall.

8. The system of claim 1 wherein the exit openings are positioned in the second flow path wall.

9. The system of claim 8, further comprising:
an actuatable closure device positioned in fluid communication with the individual exit openings to open and close the individual exit openings at the exit openings; and
a controller operatively coupled to the closure device to direct operation of the closure device, wherein the aircraft nozzle has a first exit area when the exit openings are closed, and wherein the aircraft nozzle has a second exit area greater than the first exit area when the exit openings are open.

10. The system of claim 9 wherein individual flow passages are not ventable to the adjacent flow path upstream of the corresponding exit opening.

11. The system of claim 1 wherein individual flow passages do not include a device that adds energy to the flow passing through the passage.

12. The system of claim 1 wherein the openings are distributed uniformly around a circumference of the nozzle.

13. An aircraft system, comprising:
an aircraft nozzle attachable to an aircraft turbofan engine, the nozzle including:
a first flow path bounded by a first flow path wall and being positioned to receive engine exhaust products;
a second flow path bounded by a second flow path wall and being positioned to receive engine bypass air, the first flow path wall being positioned between the first and second flow paths, the second flow path wall being positioned between the second flow path and an ambient airstream; and
aerodynamic means for passively mixing flows on opposing sides of the first flow path wall, the second flow path wall, or both the first and second flow path walls at circumferentially spaced apart locations via individual flow passage openings that are angled circumferentially by a greater amount toward a first neighboring flow passage opening in a first circumferential direction than toward a second neighboring flow passage opening in a second circumferential direction opposite the first circumferential direction.

14. The system of claim 13 wherein the aerodynamic means includes multiple, circumferentially-extending and circumferentially-spaced apart elongated passages positioned in at least one of the first and second flow path walls.

15. The system of claim 13 wherein the aerodynamic means does not add energy to the flow directed from one side of the corresponding flow path wall to the other.

16. The system of claim 13, further comprising means for controlling flow area through the flow passage openings.

17. The system of claim 16 wherein the means for controlling the flow areas includes an actuator coupled to a movable device that opens and closes at least one of the flow passages at an exit of the at least one flow passage.

* * * * *